United States Patent
Breen et al.

(10) Patent No.: US 6,208,356 B1
(45) Date of Patent: *Mar. 27, 2001

(54) IMAGE SYNTHESIS

(75) Inventors: Andrew P Breen, Suffolk; Emma J Bowers, Peterborough, both of (GB)

(73) Assignee: British Telecommunications public limited company, London (GB)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/043,148
(22) PCT Filed: Mar. 24, 1997
(86) PCT No.: PCT/GB97/00818
    § 371 Date: Mar. 13, 1998
    § 102(e) Date: Mar. 13, 1998
(87) PCT Pub. No.: WO97/36288
    PCT Pub. Date: Oct. 2, 1997

(51) Int. Cl.[7] .................................................. G06T 15/00
(52) U.S. Cl. .......................................... 345/473; 345/474
(58) Field of Search .................................. 345/418, 472, 345/473, 474

(56) References Cited

U.S. PATENT DOCUMENTS

| | | | |
|---|---|---|---|
| 4,913,539 | * | 4/1990 | Lewis . |
| 5,313,522 | * | 5/1994 | Slager . |
| 5,546,518 | * | 8/1996 | Blossom et al. ........... 345/473 |
| 5,548,693 | * | 8/1996 | Shinya ........................ 345/473 |
| 5,568,602 | * | 10/1996 | Callahan et al. .......... 345/473 |
| 5,577,175 | * | 11/1996 | Naka et al. ................ 345/473 |

FOREIGN PATENT DOCUMENTS 689 362 * 12/1995 (EP) .
2 231 246 * 11/1990 (GB) .

OTHER PUBLICATIONS

Gasper Elon, "Getting a Head with Hyperanimation", Dr. Dobb's Journal of Software Tools, Jul. 1998, vol. 13, No. 7, pp. 18–34, ISSN 0888–3076 QH76.D617.

Lewis J. P. and Parke F. I., "Automated Lip–Synch and Speech Synthesis for Character Animation", SIGCHI Bulletin, spec. issue, pp. 143–7, ISSN 0736–6906 QH 76.76.H94 H95 1989.

Lobanov B., "On the Acoustic Theory of Coarticulation and Reduction", International Conference on Acoustic, Speech and Signal Processing, 1982, vol. 2, pp. 915–8, TK7882.565137a.

Pelachud C., Badler N. I., & Steedman M., "Linguistic issues in facial animation" in N. M. Thalmann and D. Thalmann (Eds) Computer Animation '92, Tokyo, Springer–Verlag TR897.5. C657 1991.

Welsh, et al., "Model–Based Image Coding", BR TELECOM TECHNOL J., vol. 8, No. 3, Jul. 1990, pp. 94–106.

Mahoney, "Facial Animation", COMPUTER GRPAHIC WORLD, Jan. 1995, pp. 60–62.

Luo et al., "A Novel Approach For Classifying Continuous Speech Into Visible Mouth–Shape Related Classes", 1994 IEEE, pp. I–465–I–468.

(List continued on next page.)

Primary Examiner—Cliff N. Vo
(74) Attorney, Agent, or Firm—Nixon & Vanderhye P.C.

(57) ABSTRACT

Synthesis of a moving picture of a face (e.g. to accompany synthetic speech) is performed by converting an input phoneme string into a sequence of mouth shapes or visemes. Specifically a shape is generated for each vowel and for each transition involving a consonant.

14 Claims, 17 Drawing Sheets

OTHER PUBLICATIONS

Morishima et al., "Facial Animation Synthesis or Human–Machine Communication System", International Conference On Human–Computer Interaction, vol. 2, pp. 1085–90.

Cohen, et al., "Modeling Coarticulation in Synthetic Visual Speech", in N.M. Thalmann and D. Thalmann (eds) Models and Techniques in Computer Animation "92, Tokyo, Springer–Verlag, pp. 139–157.

Morishima, et al. "A Real–Time Facial Action Image Synthesis System Driven by Speech and Text", SPIE, vol. 1360, Visual Communications and Image Processing "90, pp. 1151–1158.

Carraro et al., "A Telephonic Lip Reading Device for The Hearing Impaired", Conference Colloquim "Biomedical Applications of Digital Signal Processing", Digest No. 144, pp. 10/1–8.

Bothe et al., "Artificial Visual Speech Synchronized with a Speech Synthesis System", conf., "Computers for Handicapped Persons", 1994, pp. 32–37.

Montgomery et al., "The Use of Visible Lip Information In Automatic Speech Recognition", PROCEEDINGS OF EUSIPCO–86: Third European Signal Processing Conference, vol. 1, pp. 577–580.

Cohen et al., "Development and Experimentation with Synthetic Visible Speech", May 1994, Behaviour Research Methods, Instruments & Computers, vol. 26, No. 2, pp. 260–5.

Page et al., "The Laureate Text–to–Speech System –Architecture and Applications", BT TECHNOL J, vol. 14, No. 1, Jan. 1996, pp. 57–67.

SYSTEMS & COMPUTERS IN JAPAN, vol. 22, no. 5, 1 Jan. 1991, pp. 50–59, Morishima et al, "A Facial Motion Synthesis for Intelligent Man–Machine Interface".

* cited by examiner

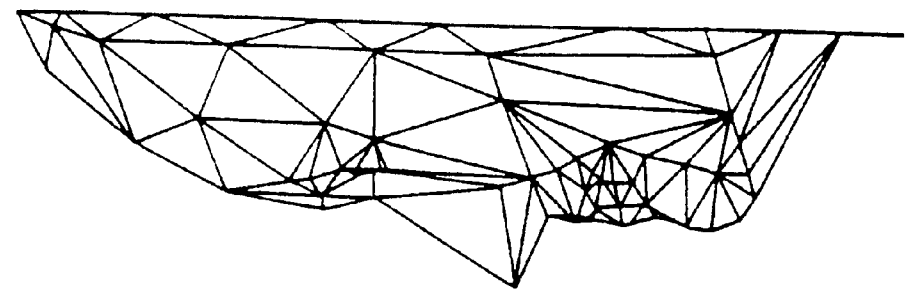
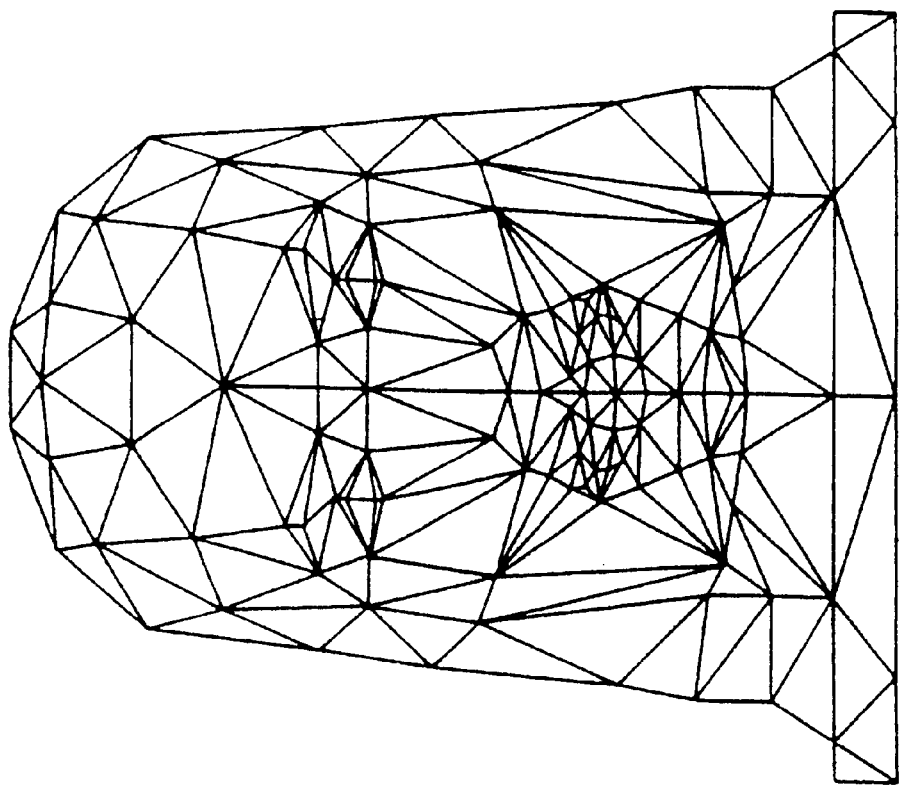
Fig.2.
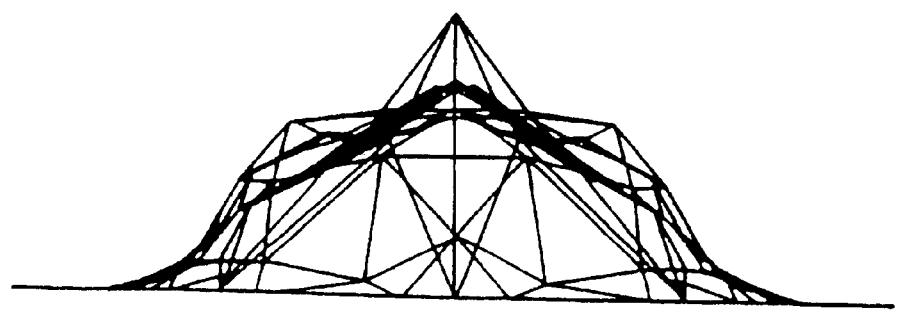

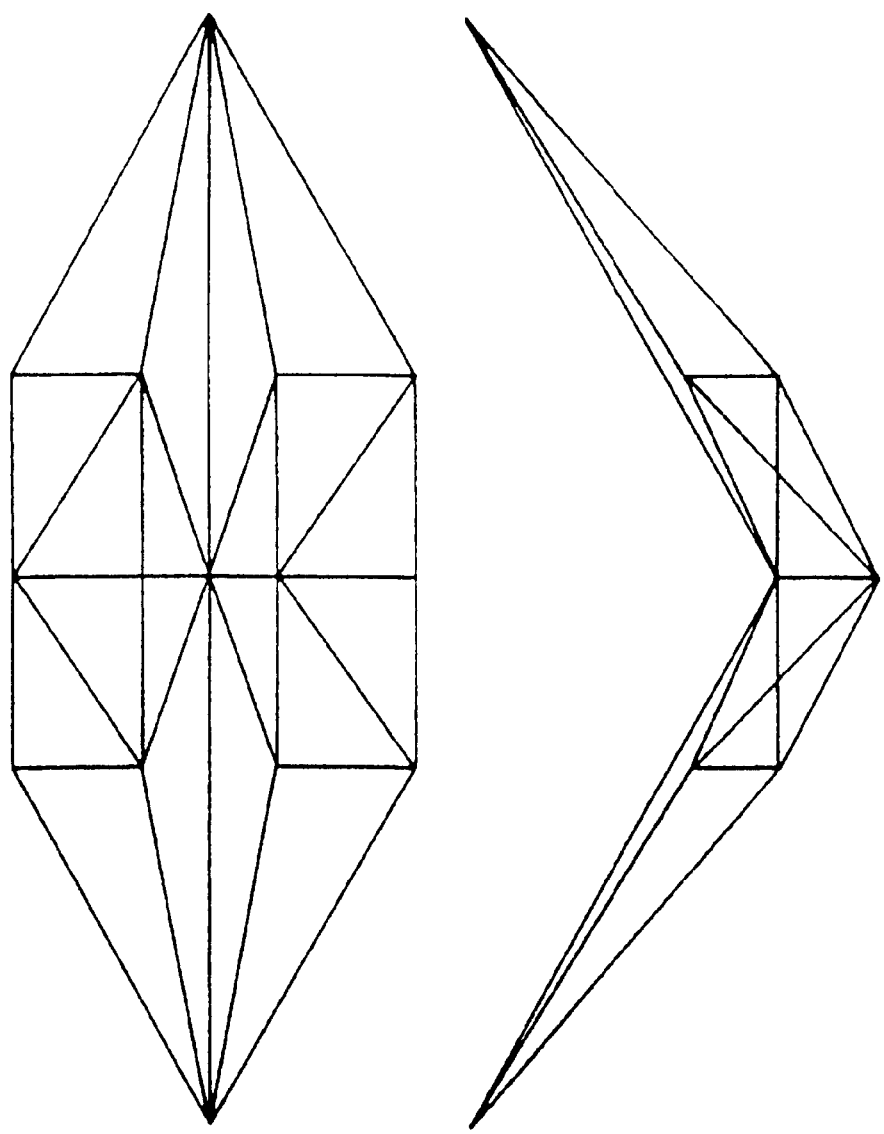
Fig.3.
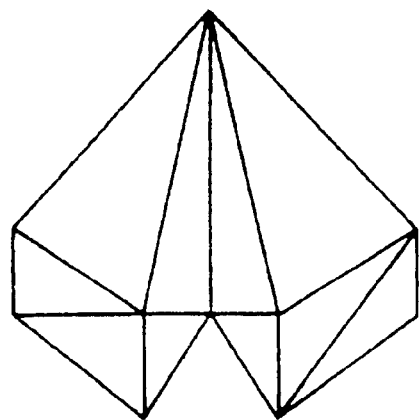

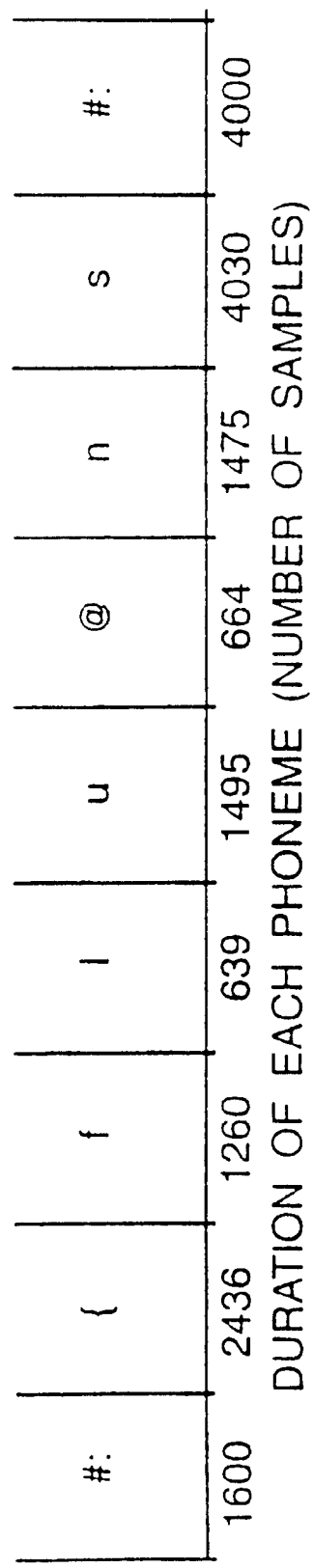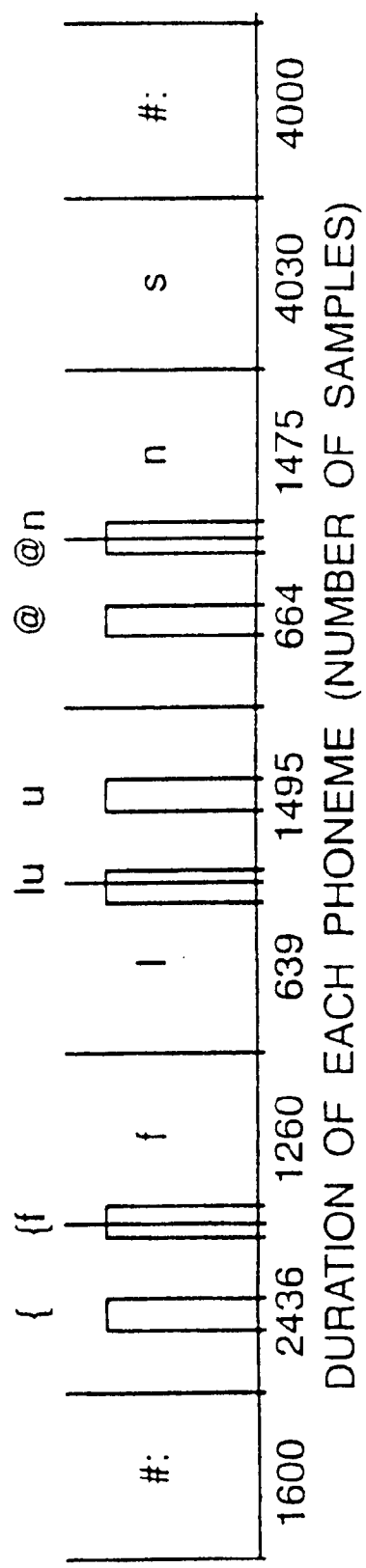
Fig.5.

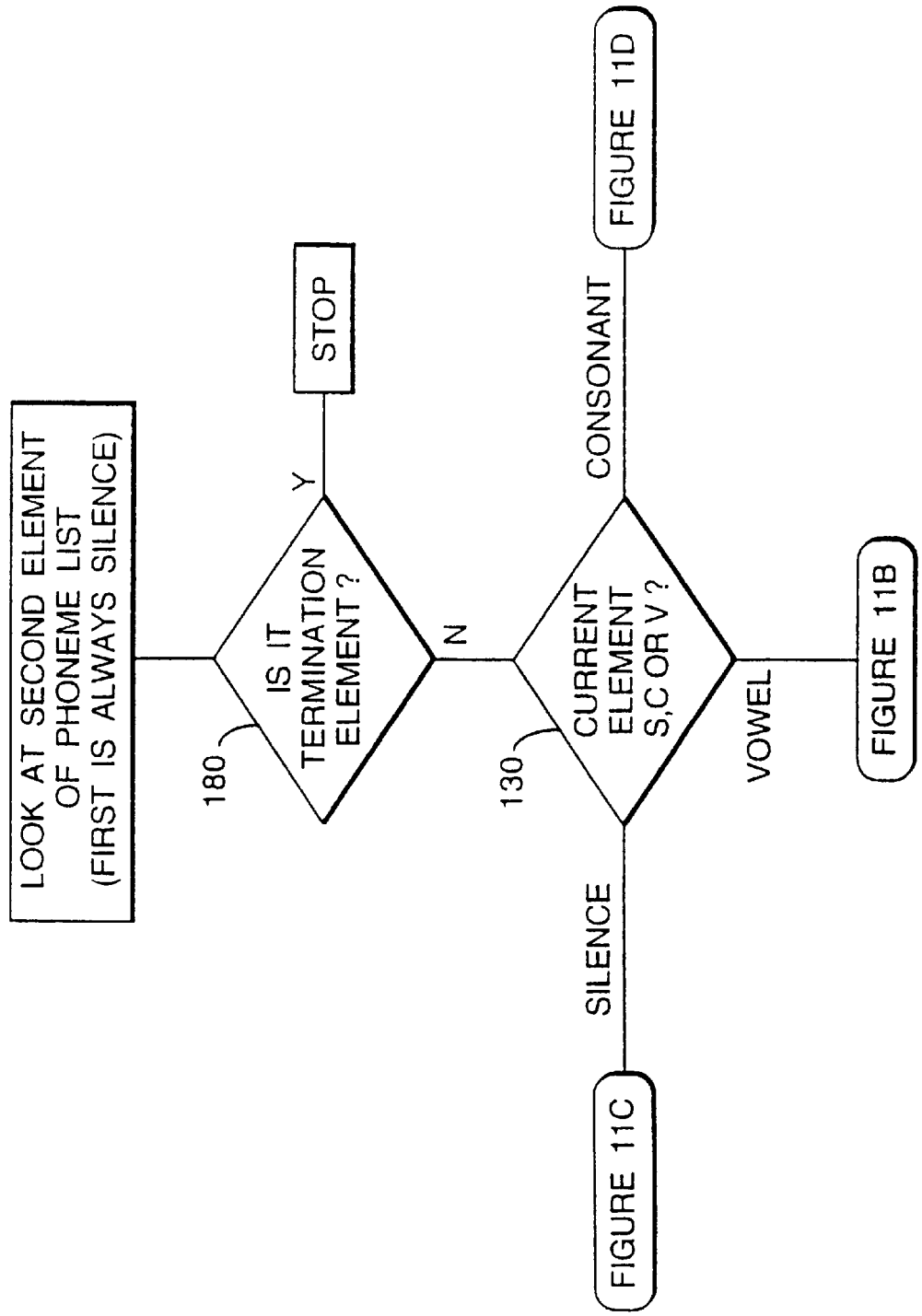

IMAGE SYNTHESIS

BACKGROUND OF THE INVENTION

1. Field of the Invention

The present invention relates to synthesis of moving images, for example to accompany synthetic speech.

2. Related Art

In prior art such as European Patent Application 0,225, 729 visual images of the face of a speaker are processed to extract during a learning sequence a still frame of the image and a set of typical mouth shapes. Encoding of a sequence to be transmitted, recorded etc. is then achieved by matching the changing mouth shapes to those of the set and generating codewords identifying them. Alternatively, the codewords may be generated to accompany real or synthetic speech using a look-up table relating speech parameters to codewords. In a receiver, the still frames and set of mouth shapes are stored and received codewords used to select successive mouth shapes to be incorporated in still frame. However, such prior art leaves room for improvement in transitioning between sounds from two specific groups of phonemes.

SUMMARY OF THE INVENTION

Hitherto, the synthesis of an image of a face to accompany an utterance has relied on the selection of facial images corresponding to the phonemes in the utterance—intervening images are provided by interpolation between those facial images. One example of such an image synthesiser is disclosed in a paper presented by Shigeo Morishima et al. and entitled 'A Facial Motion Synthesis for Intelligent Man-Machine interface' at pages 50–59 in Systems and Computers in Japan 22(1991) No. 5. Another example is disclosed in U.S. Pat. No. 5,313,522.

According to the present invention there is provided a method of generating signals representing a moving picture of a face having visible articulation matching a spoken utterance, comprising: receiving a sequence of phonetic representations corresponding to successive portions of the utterance; identifying a mouth shape for each phonetic representation of a first type; identifying a mouth shape for each transition from a phonetic representation of the first type to a phonetic representation of a second type, for each transition from a phonetic representation of the second type to a phonetic representation of a first type and for each transition from a phonetic representation of the second type to a phonetic representation of the second type; and generating a sequence of image frames including the identified shapes.

The first and second types may be vowels and consonants respectively; thus, a preferred embodiment of the invention provides a method of generating signals representing a moving picture of a face having visible articulation matching a spoken utterance, comprising: receiving a sequence of phonetic representations corresponding to successive phonemes of the utterance; identifying a mouth shape for each vowel phoneme; identifying a mouth shape for each transition from a vowel phoneme to a consonant phoneme, for each transition from a consonant phoneme to a vowel phoneme and for each transition from a consonant phoneme to a consonant phoneme; and generating a sequence of image frames including the identified shapes.

The identification of a mouth shape for each transition between consonant and vowel phonemes may be performed as a function of the vowel phoneme and the consonant phoneme, whilst the identification of a mouth shape for each transition between two consonant phonemes may be performed as a function of the first of the two consonant phonemes and of the vowel phoneme which most closely follows or precedes it. Alternatively the identification of a mouth shape for each transition between two consonant phonemes may be performed as a function of the first of the two consonant phonemes and of the vowel phoneme which most closely follows it or in the absence thereof that which precedes it.

Preferably the identification for each transition is performed as a function of only those phonemes specified above in relation to those transitions. Alternatively, the identification could be performed as a function also of at least one other phoneme within the same word.

In a preferred arrangement, one may generate for each identified mouth shape a command specifying that shape and intermediate commands each of which specifies a shape intermediate the shapes specified by the preceding and following commands.

In another aspect of the invention there is provided an apparatus for generating signals representing a moving picture of a face having visible articulation matching a spoken utterance, comprising:

means arranged in operation to receive a sequence of phonetic representations corresponding to successive portions of the utterance and in response thereto to identify a mouth shape for each phonetic representation of a first type and identify a mouth shape for each transition from a phonetic representation of the first type to a phonetic representation of a second type, for each transition from a phonetic representation of the second type to a phonetic representation of a first type and for each transition from a phonetic representation of the second type to a phonetic representation of the second type;

and means for generating a sequence of image frames including the identified shapes.

One embodiment of the invention will now be described, by way of example, with reference to the accompanying drawings, in which:

BRIEF DESCRIPTION OF THE DRAWINGS

FIG. 2 shows a plan, and front and side elevations of the 'wireframe' used in synthesising an image of a human head;

FIG. 3 shows similar views of a 'wireframe' used in synthesising an the mouth portion of an image of a human head;

FIG. 5 shows where the maximum vowel to consonant (and vice versa) transitional mouth shapes occur in the word 'affluence';

FIGS. 11A to 11D illustrate the procedure for producing an intermediate output file on the basis of the input phoneme file;

DETAILED DESCRIPTION OF EXEMPLARY EMBODIMENTS

Figure 1:
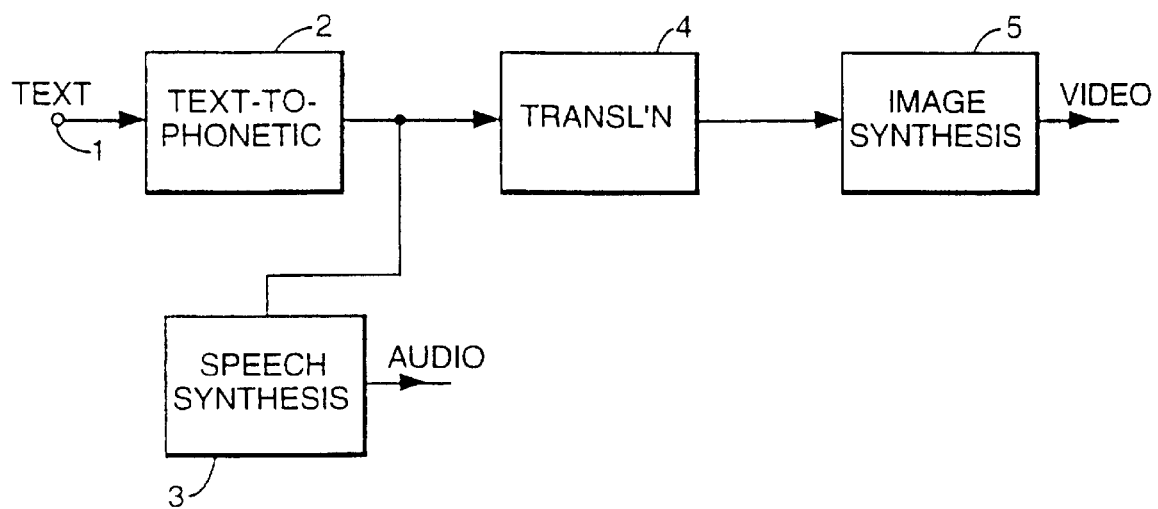
FIG. 1 is a functional block diagram showing the elements of the embodiment.

The apparatus of FIG. 1 has the function of receiving words to be spoken, in the form of text, and generating corresponding speech in the form of an audio signal and generating a corresponding video signal for display of a moving picture of a face (human or cartoon for example) with mouth articulation which corresponds to that same speech. In this description, reference will often be made to mouth articulation; it is to be understood that this articulation may include movement of the lips, interior of the mouth (including, if wished, teeth and tongue), jaw, and surrounding areas. Other movements such as gross head movement or rotation, eyebrow movement and so forth may be included also in order to make the resulting image appear more realistic.

The text, from a stored text file or other desired source is received at an input 1 in the form of character codes according to any convenient standard representation (e.g. ASCII code). It is received by a speech synthesiser of conventional construction but shown here as two separate parts, namely a text-to-phonetic converter 2 which converts conventional orthography into a phonetic representation, for example, a list of phonemes and the duration of each, and the speech synthesiser proper 3 which converts the list into an audio frequency waveform. Any phoneme set may be used, but for the purposes of this description use of the British RP-SAMPA set is assumed which identifies 38 distinct phonemes of British English as set out in Table 1 below.

TABLE 1

| BRITISH RP-SAMPA | WORD EXAMPLE |
|---|---|
| CONSONANTS | |
| /b/ | bear |
| /D/ | this |
| /d/ | dear |
| /f/ | fear |
| /g/ | gear |
| /h/ | hear |
| /j/ | year |
| /k/ | king |
| /l/ | lead |
| /m/ | men |
| /N/ | wing |
| /n/ | near |
| /p/ | pear |
| /r/ | rear |
| /S | sheer |
| /s/ | sing |
| /T/ | thing |
| /t/ | tear |
| /v/ | very |

TABLE 1-continued

| BRITISH RP-SAMPA | WORD EXAMPLE |
|---|---|
| /w/ | wear |
| /Z/ | treasure |
| /z/ | zoo |
| AFFRICATES | |
| /dZ/ | jeer |
| /tS/ | cheer |
| SHORT VOWELS | |
| /@/ | ago |
| /{/ | bat |
| /E/ | bet |
| /I/ | bit |
| /Q/ | cod |
| /U/ | good |
| /V/ | bud |
| LONG VOWELS | |
| /3/ | bird |
| /A/ | bard |
| /i/ | bead |
| /O/ | bore |
| /u/ | boot |
| DIPHTHONGS | |
| /@U/ | zero |
| /ai/ | pie |
| /aU/ | cow |
| /E·169 / | hair |
| /el/ | pay |
| /I@/ | peer |
| /OI/ | boy |
| /U@/ | contour |
| OTHER | |
| /#:/ | Silence |
| /#/ | Word boundary |

As the speech synthesiser is conventional, it will not be described further here.

The phoneme list is received by a translation unit 4 which will be described in more detail below. It serves to generate, from the phoneme list, a series of command signals specifying the mouth articulation required of the face in order that it should move in a manner corresponding to the phoneme list and hence to the speech signal generated by the synthesiser 3.

These command signals are received by an image synthesis unit 5. This unit has stored in it a single video frame or bit-map image of a still picture of the desired face, and serves to generate a continuous video signal showing this face, but with movement. Obviously this video signal can be to any standard wished; here a System I signal at 25 frames per second is assumed. The movement is generated by with the aid of a three-dimensional wire frame model. A typical such model is shown in FIG. 2, with the mouth area being shown enlarged in FIG. 3. It has a number of points (vertices) in three-dimensional space and lines joining these vertices define triangular areas referred to as facets. In the actual apparatus, the model exists as a set of stored data, namely, for each vertex, a vertex number and its x, y, z co-ordinates and, for each facet, a facet number and the numbers of the three vertices forming the corners of the facet. During an initialisation phase, the unit 5 determines a mapping between each facet of this reference model and a corresponding area of the bit-map image. Movement is created by repeatedly defining a changed model in which one or more of the vertices assumes a different position from the position it occupied in the reference model. The unit 5 then needs to generate a new two-dimensional bit-map image. This it does by identifying any facet of the changed model one or more of the vertices of which have moved relative to the reference model; for each such facet it employs an interpolation process in which that triangular area of the original bit-map which, in accordance with the mapping, corresponds to it is moved and/or distorted to occupy in the new bit-map image a triangular area which, in accordance with this mapping, corresponds to the facet of the changed model. Such a new bit-map image is generated for each frame of the output signal (i.e. every 40 ms). For more details of the operation and implementation of the image synthesis unit 5, reference may be made to W. J. Welsh, S. Searby and J. B. Waite, "Model Based Image Coding", Br. Telecom Technol. J., vol 8, No. 3, July 1990.

The commands needed to drive the image synthesis unit 5 could, in principle, consist of sending to the unit, every 40 ms, the number of each vertex whose position differs from the reference model, accompanied by its new co-ordinates. In the interests of speed of operation, however, the unit 5 contain a stored set of action units, each of which is a data entry consisting of:

an action unit number (e.g. 0 to 255) (1 byte)
    the number of vertices affected by the action unit
    for each such vertex:
        the vertex number (2 bytes)
        its x-co-ordinate displacement from its position in the reference model (2 bytes)
        its y-co-ordinate displacement from its position in the reference model (2 bytes)
        its z-co-ordinate displacement from its position in the reference model (2 bytes).

(If preferred, of course, x, y, z shifts relative to the previous frame could be used).

Each command may then consist simply of an action unit number followed by a scaling factor (e.g. from 0 to 255) to vary the amount of movement specified by the action unit; or if desired may contain several (in a prototype, up to five were permitted). The unit 5, upon receipt of the command, looks up the action unit(s) and uses the stored co-ordinate shifts (scaled as appropriate) for the specified vertices. If the command contains two action units both of which specify a displacement of a particular vertex, then the displacement is simply the vector sum of the two displacements.

Returning now to examine the operation of the translation unit 4, it is convenient to introduce the concept of a viseme. Just as spoken words may be regarded as composed of elemental units called phonemes, visual speech may be regarded as composed of visemes—the minimal units of visual speech, or "the smallest perceptible unit of the visual articulatory unit". Basically, a viseme is a mouth shape; the task of the translation unit is to determine what visemes are required, and the time instants at which they occur (quantised to multiples of 40 ms), and then to generate commands at 40 ms intervals such as to generate the required visemes at the required intervals and to generate appropriate intermediate shapes for the intervening frames.

Central to the operation of the translation unit is the notion that there is not a 1:1 correspondence between phonemes and visemes. Firstly, some phonemes are visually similar or even indistinguishable; for example the consonants /p/ and /b/ are visually identical since they differ only by the degree of voicing and the articulation of the vocal tract is the same. Thus phonemes can be grouped, with phonemes of the same group being considered identical as far as viseme generation is concerned. Various groupings are possible; a typical grouping is shown in Table 2 below:

TABLE 2

| Phonemes | Group |
|---|---|
| p, b, m | Consonant group 1 |
| f, V | Consonant group 2 |
| D, T | Consonant group 3 |
| s, z | Consonant group 4 |
| s, Z | Consonant group 5 |
| k, g, N | Consonant group 6 |
| t, d, l, n, r | Consonant group 7 |
| w, U, u, O | "Both" group |
| Q, V, A | Vowel group 1 |
| 3, i, j | Vowel group 2 |
| @, E, I, { | Vowel group 3 |

(note that diphthongs are absent since these are divided into their constituent vowels before processing)

Secondly, whilst it is possible to define an association between a vowel sound and a mouth shape, this is not so with a consonant where the mouth shape varies in dependence upon nearby phonemes, especially nearby vowel phonemes. In the present embodiment mouth shapes are associated both with vowels and with combinations of a consonant and a phoneme. There are a significant number of transitions involving consonants. However a first simplification can be made by observing that a consonant to consonant transition is heavily influenced by the following vowel (or, at the end of a word before a pause, the preceding vowel) and whilst the second consonant of the two has some effect this is quite subtle and can be ignored. The present embodiment takes advantage of this by associating a consonant-vowel or vowel-consonant combination with each consonant to consonant transition. In this way, the number of mouth shapes that need be handled by the system is kept low.

To illustrate the operation of the present embodiment by way of example, if the text-to-phonetic unit 2 were to receive a signal representing the word 'affluence', it would operate to output the phoneme list /#:/ /{/ /f/ /l/ /u/ /@/ /n/ /s/ /#:/ to the translation unit 4. On receiving that phoneme list the translation unit 4 would be operable to process the phoneme list to output a series of command signals. The output command signals are illustrated in FIGS. 4 to 7, each of which also illustrates the contents of the input phoneme list, i.e. the phonemes themselves and their duration in samples (in this example the sample rate is 8 kHz).

Figure 4:
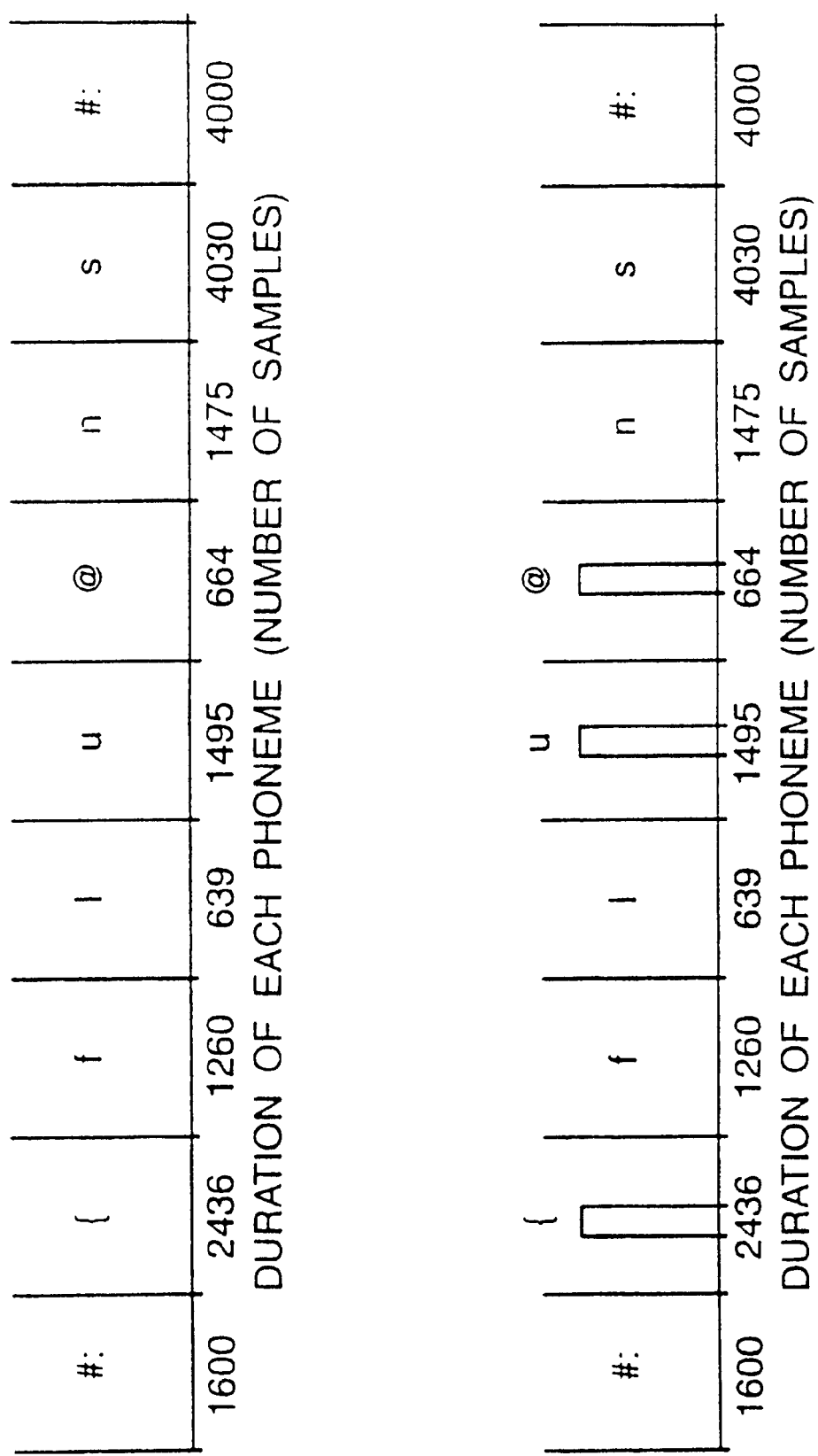
FIG. 4 shows where the maximum vowel mouth shapes occur in the synthesis of a sequence of images to represent a human head saying 'affluence'.

Firstly, the output includes three command signals corresponding to the vowels in the word. These are shown in FIG. 4 where, in the lower diagram, the vowels /{/, /u/ and /@/ have been identified and are each marked with a bar indicating that the viseme allocated to that vowel has been determined; it is taken to occur at the mid-point of the vowel.

The output further includes command signals specifying the mouth shapes associated with the vowel-consonant and consonant-vowel transitions; this is illustrated in FIG. 5 where bars show the mouth shapes at the vowel-consonant or consonant-vowel boundaries. This leaves the consonant—consonant transitions. As mentioned earlier, the transition is regarded as being characterised chiefly by the first consonant and the next vowel following; thus the transition /f/ to /l/ is represented (in FIG. 6) as the mouth shape for the consonant-vowel combination /f/ to /u/. The /n/ to /s/ transition has no following vowel and therefore the mouth shape used is that corresponding to the /@/ to /s/ vowel-consonant combination—i.e. using the preceding vowel. The preceding and following silence periods /#:/ are of course represented by a face with a closed mouth—i.e. the reference wire frame model.

Figure 6:
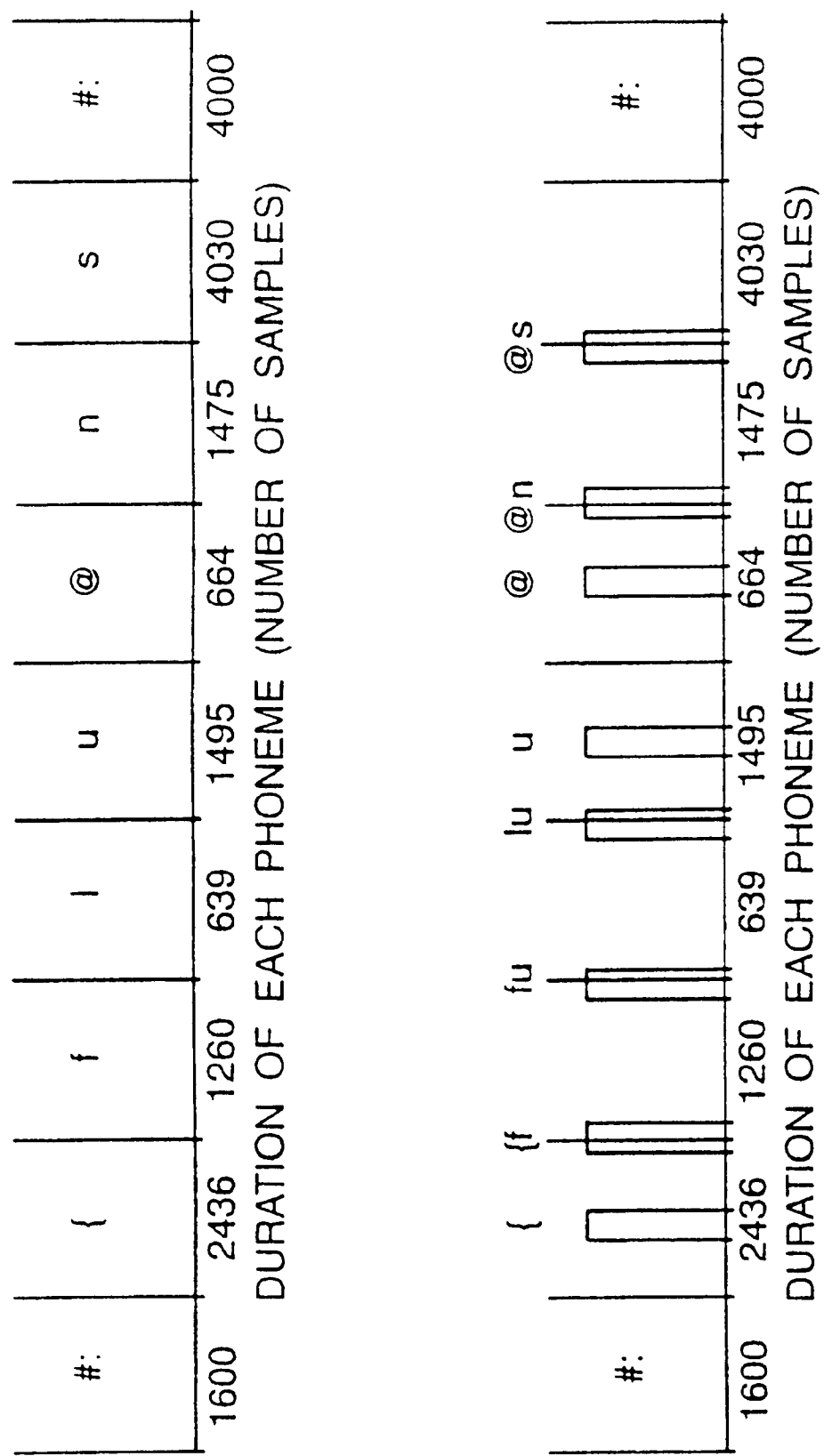
FIG. 6 illustrates the remaining mouth shapes in the articulation of the word 'affluence'.
Figure 7:
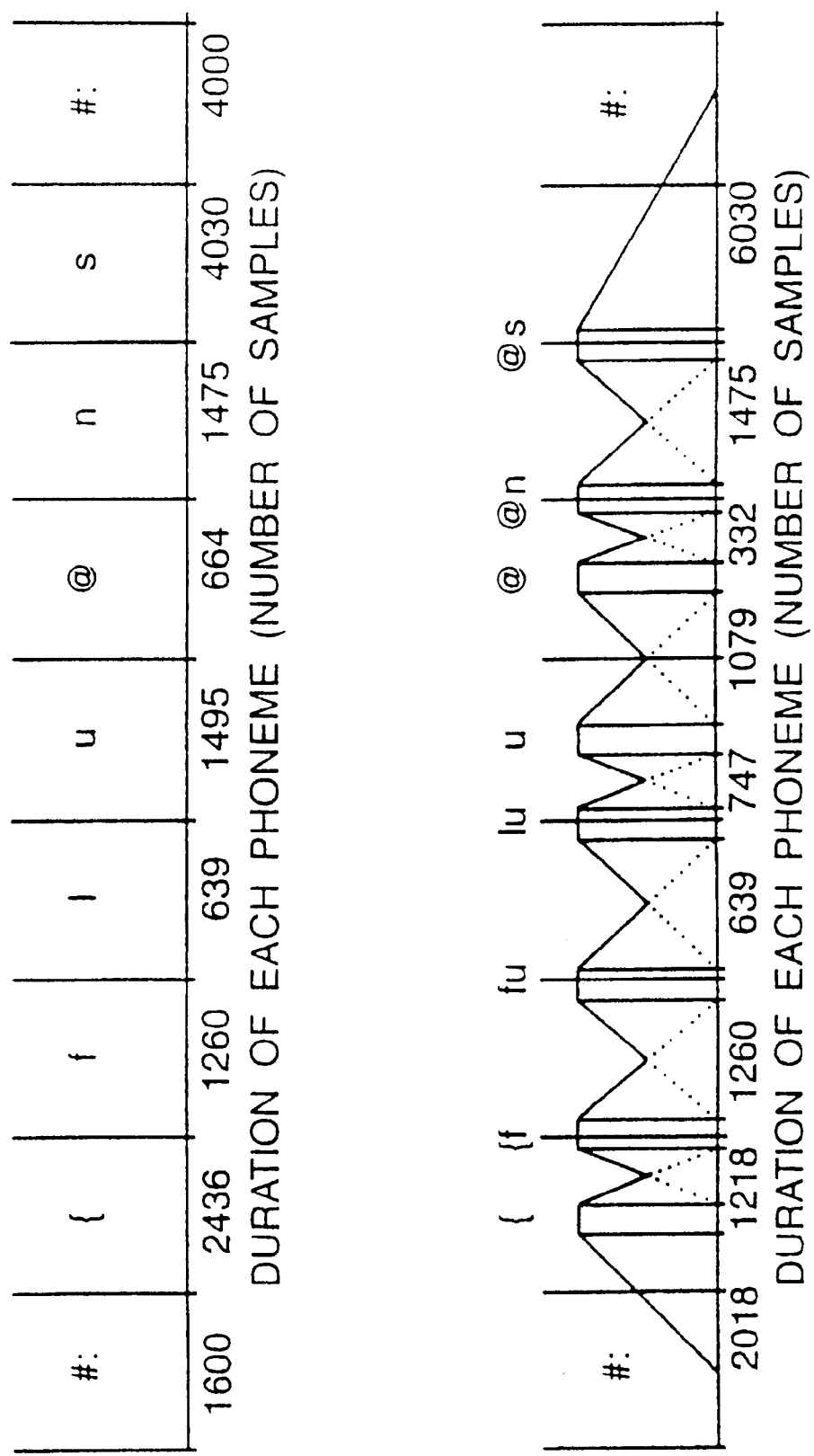
FIG. 7 illustrates the transitions between the mouth shapes in the articulation of the word 'affluence'.

At the time instants marked with the bars in FIG. 6 (or rather, at the nearest 40 ms period to those instants), the translation unit 4 sends to the image synthesis unit 5 a command specifying an action unit and scaling factor appropriate to the mouth shape in question. At 40 ms intervals between those instants, it is necessary to send a command specifying a mouth shape intermediate the two mouth shapes. For example, between the instant marked {f and the instant marked fu it sends a command specifying the two action units corresponding to the vowel-consonant combination /{/ to /f/ and the consonant-vowel combination /f/ to /u/ respectively, albeit with reduced scaling factors, so as to achieve a smooth transition between the two shapes. Thus at a point x % of the way between the two instants, the action unit for the combination /{/ to /f/ would be sent with a scale factor 1−x/100 times its scale factor at the {f point, along with the action unit for the combination /f/ to /u/ with a scale factor of x/100 times its scale factor at the fu point. FIG. 7 shows this process graphically. It will be seen that for the purposes of creating intermediate command signals, the mouth shape associated with the silence phoneme is not affected by the following mouth shape before the centre of the silence phoneme is reached.

Of the 11 groups in the above Table 2 above, there are 7 consonant groups, three vowel groups and one so-called "both" group. The "both" group includes both vowel phonemes and consonant phonemes. Thus, ignoring transitions involving silence, all the required vowels and vowel-consonant and consonant-vowel combinations can be represented by the vowel groups and vowel group-consonant group and consonant group-vowel group combinations shown in Table 3 below:

TABLE 3

| | |
|---|---|
| Vowels | 4 |
| Consonant group to vowel group combinations | 21 |
| Vowel group to consonant group combinations | 21 |
| Both group to other group combinations | 10 |
| Other group to both group combinations | 10 |
| Both group to both group combinations | 2 |
| Total | 68 |

Some of these 68 vowel groups and group combinations correspond to identical mouth shapes; moreover some mouth shapes are similar to others, differing primarily in proportions—i.e. they can be created by the same action unit but with a different scaling factor. During determination of the action units (to be described below) it was found that these 68 vowel groups and group combinations could be represented by eleven action units and an appropriate scaling factor. Table 4 below sets out these, with a description of the action unit, a note of the feature which increases with the scaling factor, and a list of the vowel groups and group combinations which can be represented by that action unit. The scaling factors to be used in creating the respective mouth shapes that correspond to given vowel groups and group combinations are also shown.

It will be realised by those skilled in the art that a larger number of action units might be defined, with the vowel groups and group combinations being more finely divided amongst the action units.

TABLE 4

| Action Unit No. | Description | Vowel group or Group Combination | Scale |
|---|---|---|---|
| 1 | Rounded mouth, protruding lips, teeth together. Mouth shape gets more rounded with amount. | Vowel group 1 to Consonant group 5 | 125 |
| | | Vowel group 2 to Consonant group 5 | 130 |
| | | Vowel group 3 to Consonant group 5 | 125 |
| | | "Both" group to Consonant group 5 | 120 |
| | | Consonant group 5 to Vowel group 1 | 120 |
| | | Consonant group 5 to Vowel group 2 | 120 |
| | | Consonant group 5 to Vowel group 3 | 125 |
| | | Consonant group 5 to "Both" group | 120 |
| 2 | No teeth, very rounded external lip line, gap between lips straight but small. Mouth shape gets more rounded with amount. | "Both" group to Vowel group 2 | 150 |
| | | "Both" group to Vowel group 3 | 150 |
| | | "Both" group to "Both" group | 150 |
| | | "Both" group to "Both" group | 130 |
| | | "Both" group to Consonant group 7 | 120 |
| | | Consonant group 7 to "Both" group | 120 |
| 3 | Long mouth shape, top teeth only, bottom lip tucked. Teeth become prominent with amount. | Vowel group 1 to Consonant group 2 | 100 |
| | | Vowel group 2 to Consonant group 2 | 110 |
| | | Vowel group 3 to Consonant group 2 | 115 |
| | | "Both" group to Consonant group 2 | 100 |
| | | Consonant group 2 to Vowel group 1 | 100 |
| | | Consonant group 2 to Vowel group 2 | 100 |
| | | Consonant group 2 to Vowel group 3 | 115 |
| | | Consonant group 2 to "Both" group | 100 |
| 4 | Mouth shape long and rounded, no teeth, gap between lips round. Gap between lips gets bigger with amount. | Vowel group 1 to "Both" group | 240 |
| | | Vowel group 1 to Consonant group 1 | 130 |
| | | Vowel group 2 to "Both" group | 240 |
| | | Vowel group 3 to Consonant group 1 | 130 |
| | | "Both" group | 130 |
| | | "Both" group to Vowel group 1 | 240 |
| | | "Both" group to Consonant group 3 | 130 |
| | | "Both" group to Consonant group 7 | 130 |
| 5 | As action unit 4 but top lip is much more curved. | Vowel group 1 | 130 |
| | | Consonant group 1 to Vowel group 1 | 95 |
| | | Consonant group 1 to "Both" group | 80 |
| 6 | Long mouth shape, top and bottom teeth visible but a gap between. The gap gets bigger with amount. | Vowel group 3 to Consonant group 6 | 110 |
| | | "Both" group to Consonant group 6 | 110 |
| | | Consonant group 1 to Vowel group 2 | 130 |
| | | Consonant group 6 to Vowel group 3 | 110 |
| 7 | Rounded mouth shape, top and bottom teeth visible but a gap between. The gap gets bigger with amount. | Vowel group 1 to Consonant group 6 | 110 |
| | | Vowel group 3 | 140 |
| | | Consonant group 6 to Vowel group 1 | 130 |
| | | Consonant group 6 to "Both" group | 110 |
| | | Consonant group 7 to Vowel group 1 | 130 |
| 9 | Long, slightly rounded mouth shape, top teeth visible. Top teeth become more prominent with amount. | Vowel group 2 | 160 |
| | | Vowel group 2 to Consonant group 6 | 160 |
| | | Consonant group 4 to Vowel group 3 | 170 |
| | | Consonant group 6 to Vowel group 2 | 160 |
| | | Consonant group 7 to Vowel group 3 | 170 |
| | | Consonant group 7 to Vowel group 3 | 125 |
| 11 | Long mouth shape, top teeth visible. Top teeth become more prominent with amount. | Vowel group 3 to Consonant group 4 | 130 |
| | | Vowel group 3 to Consonant group 7 | 120 |
| | | "Both" group to Consonant group 4 | 105 |
| | | Consonant group 4 to "Both" group | 105 |
| 12 | same as action unit 11 but the top lip is not as rounded. | Vowel group 1 to Consonant group 4 | 100 |
| | | Vowel group 1 to Consonant group 7 | 100 |
| | | Vowel group 2 to Consonant group 4 | 120 |
| | | Vowel group 2 to Consonant group 7 | 120 |
| | | Consonant group 4 to Vowel group 1 | 130 |
| | | Consonant group 4 to Vowel group 2 | 110 |
| | | | 120 |
| 13 | Long mouth shape with top teeth and tongue. Teeth become more prominent with amount. | Vowel group 1 to Consonant group 3 | 105 |
| | | Vowel group 2 to Consonant group 3 | 110 |
| | | Vowel group 3 to Consonant group 3 | 115 |
| | | Consonant group 3 to Vowel group 1 | 105 |
| | | Consonant group 3 to Vowel group 2 | 105 |
| | | Consonant group 3 to Vowel group 3 | 130 |
| | | Consonant group 3 to "Both" group | 105 |

Figure 8:
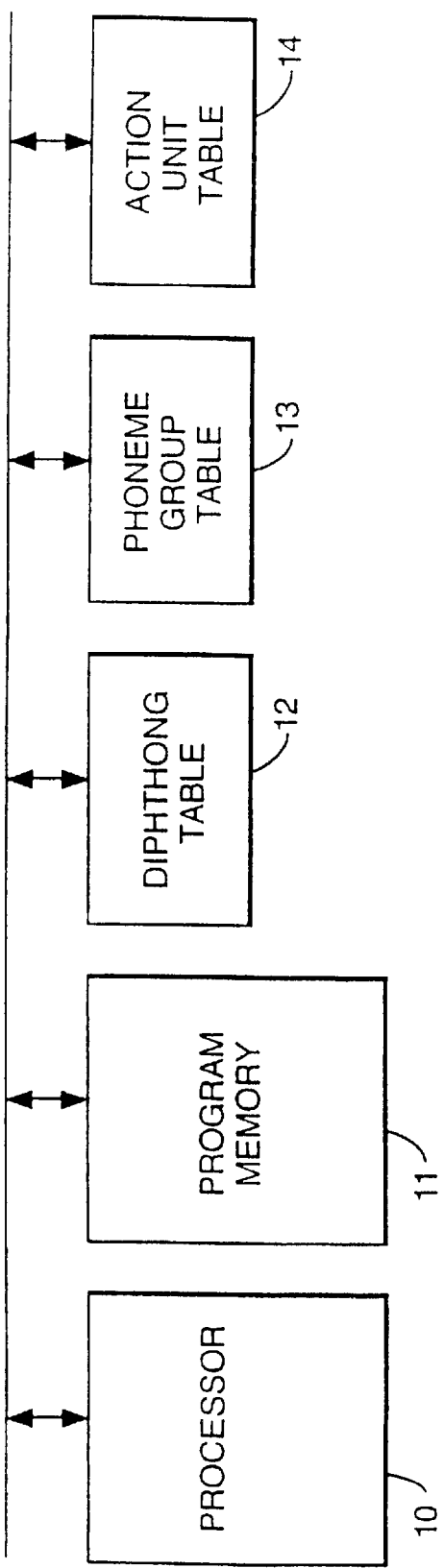
FIG. 8 is a block diagram schematically illustrating the components of the unit for translating phonetic signals into command signals for the image synthesis unit.

The translation unit 4 may be implemented by means of a suitably programmed processing unit, and thus in FIG. 8 is shown as comprising a processor 10, program memory 11, and a number of stores containing look-up tables. More particularly these comprise a diphthong table 12, a phoneme group table 13 and an action unit table 14. These are shown separately for clarity but of course a single memory could in practice contain the program and look-up tables. The operation of the program stored in the memory 11 will now be described in more detail with reference to the flowcharts shown in FIGS. 9 to 13.

Figure 9:
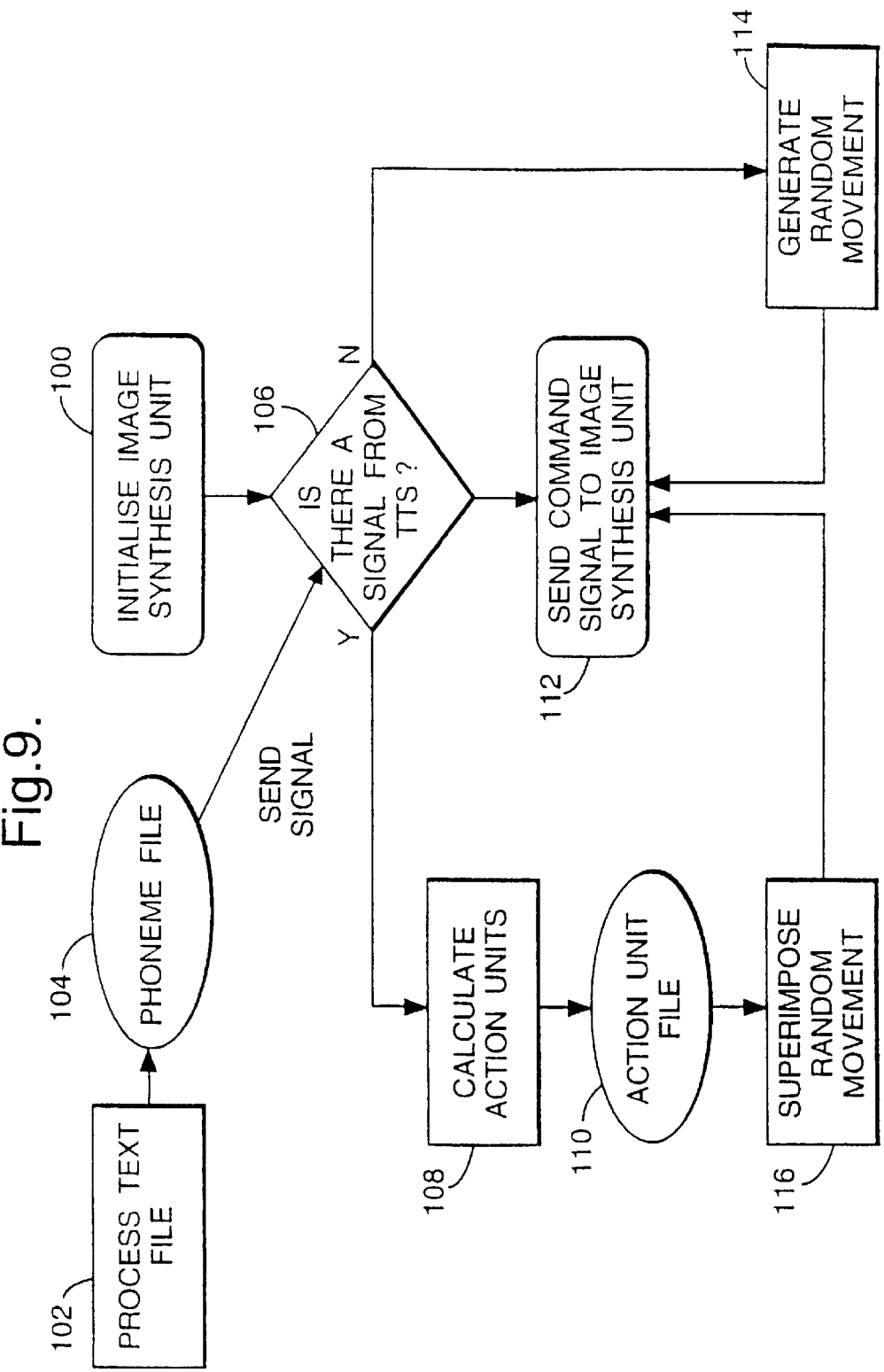
FIG. 9 is a flow chart illustrating the operation of the apparatus of the embodiment.

The flowchart of FIG. 9 simply illustrates the operation of the apparatus as a whole, setting the context within which the algorithm represented by FIGS. 10 to 13 occurs. The algorithm is stored in the program memory 11 and is executable to generate an action unit file (comprising action units and scaling factors) which forms the basis for the command signals to be sent to the image synthesis unit 5. Thus following initialisation in step 100, a text message is received 102 by the text-to-phonetic unit 2 of the speech synthesiser, which produces at 104 a phoneme file. When receipt of this file is recognised by the translation unit 4 (step 106), translation takes place (step 108) of the phoneme list into an action unit file (produced at 110). This forms the basis for the command signals which are transmitted (step 112) to the image synthesis unit 5 whilst the phoneme file is sent to the synthesiser 3. If desired during silence (step 114) or during speech (step 116) additional action units may be generated to create random (or other) head movement.

Figure 10:
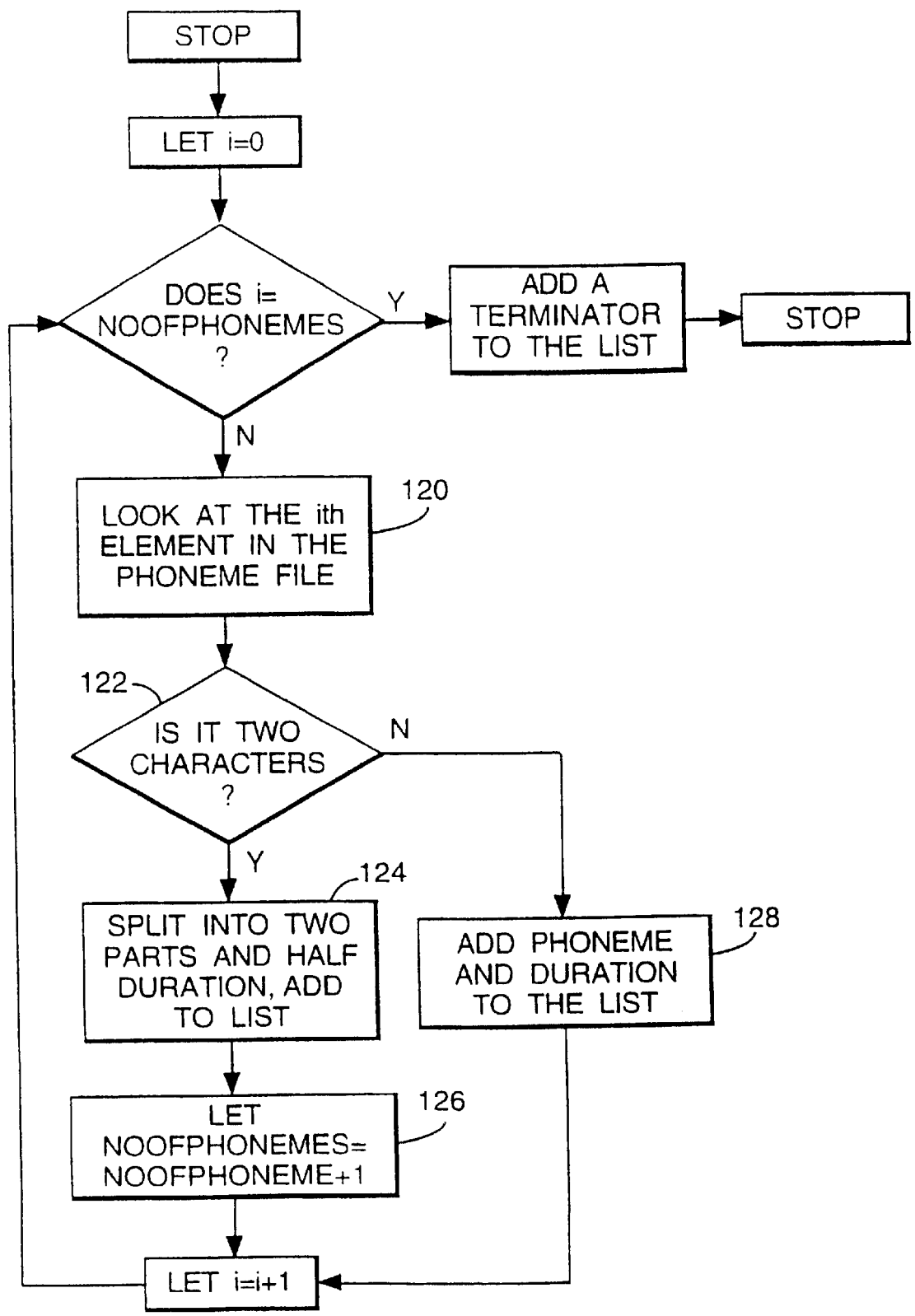
FIG. 10 is a flow chart illustrating the procedure for conversion of diphthongs and affricates into their constituent phonemes.

The operation of step 108 begins with the expansion of diphthongs and affricates using the program steps illustrated by the flow chart shown in FIG. 10. The program reads (step 120) each element of the phoneme file in turn and determines (step 122) whether that phoneme is represented by two characters. If it is, the program causes the processor (step 124) to divide the element into its constituent characters and replaces the element with the two phonemes represented by those characters. The duration of each is set to one half of the duration of the diphthong or affricate phoneme which has been split. A variable (noofphonemes) measuring the number of phonemes in the list of phonemes output is then incremented by one (step 126). Otherwise, the element is added to the phoneme list (step 128).

It will be seen how the illustrated program steps are executable to convert diphthongs such as /aI/, /aU/, and /eI/ to phoneme pairs /{/+/I/, /{/+/U/ and /E/+/I/ respectively with the aid of the diphthong table 12. Similarly, the program is executable to divide the affricates /dZ/ and /tS/ into two phonemes.

This is followed by (FIGS. 11A–11D) examination of the phoneme list created by the process illustrated in FIG. 10 element by element. For each element after the initial silence phoneme, a phoneme combination or vowel and associated time interval is recorded in an intermediate output file. Thus, each entry identifies the phoneme combination or vowel along with a time interval to be created between the previous mouth shape instant and the current mouth shape instant (i.e. the time interval corresponds to the distances between the bars in FIG. 6). Unless stated otherwise below, after each entry, the program returns to a decision step 180 to determine whether the last element of the phoneme list has been reached. If it has, then examination of the phoneme list ends. If it has not, the program returns to a current element classifying step 130.

In order to examine the phoneme list, for each element it is first determined whether the element is a vowel, consonant or silence (FIG. 11A—step 130).

Figure 11B:
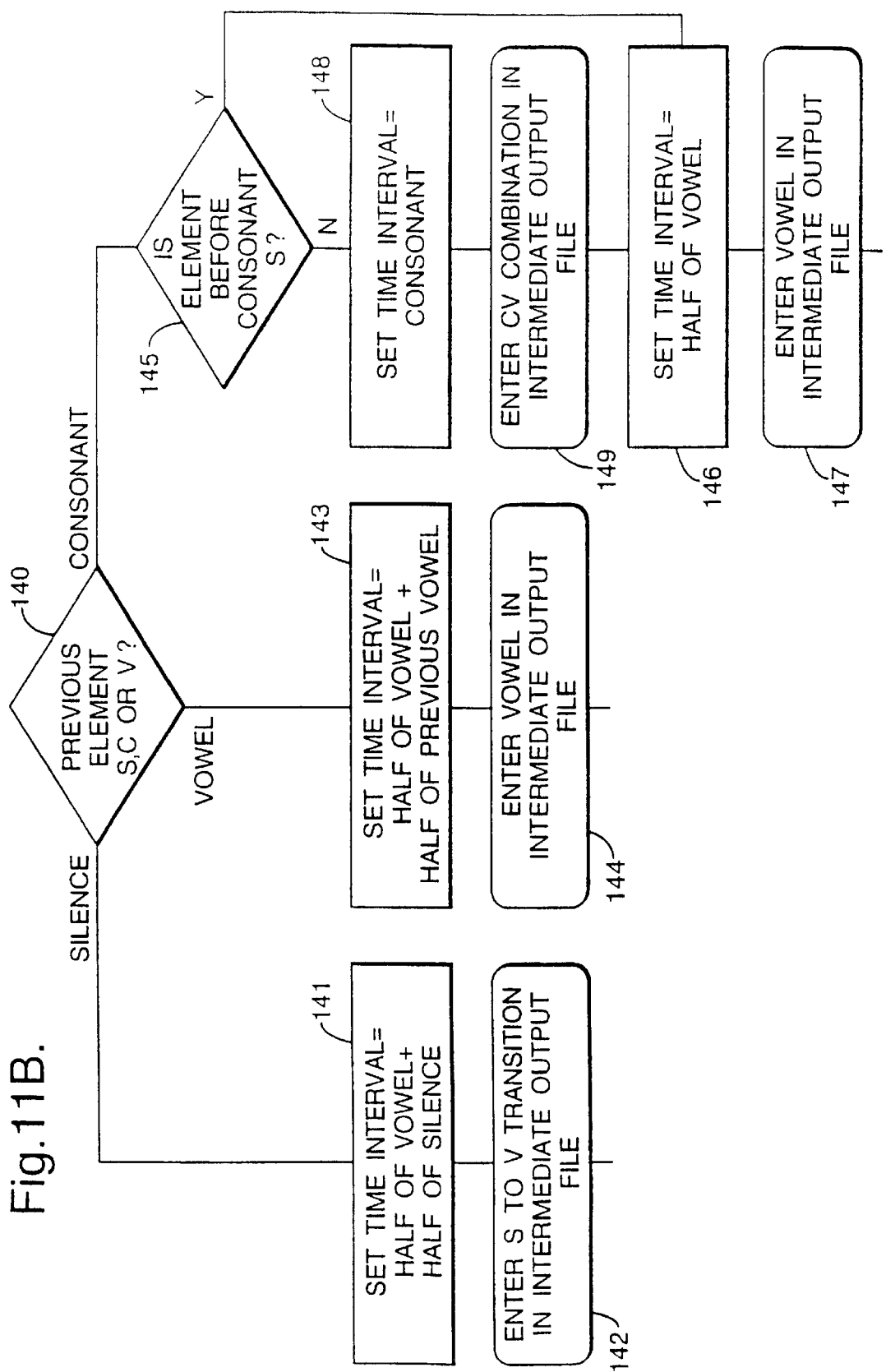

If a vowel is found in the current element classifying step 130, the steps illustrated in FIG. 11B are carried out. Firstly, it is found whether the previous phoneme in the phoneme list is a silence, consonant or vowel (step 140). If the previous phoneme is a silence phoneme, then the time interval before the vowel mouth shape is set to the sum of half of the vowel duration and half of the silence duration (step 141). The silence to vowel transition is then entered into the intermediate output file together with the calculated time interval (step 142). If the previous phoneme is a vowel phoneme, then the time interval between the vowel mouth shapes is set to the sum of half of the duration of the current vowel and half of the duration of the previous vowel (step 143). Again, the vowel itself (e.g. /@/) and associated time interval are then entered into the intermediate output file (step 144). If the previous phoneme is a consonant phoneme, then it is determined whether the phoneme before the previous phoneme is a silence (step 145). If it is, then the time interval from the previous mouth shape is set to the half the duration of the current vowel (step 146) and the vowel is entered into the intermediate output file together with the calculated time interval (step 147). If it is not, then the time interval from the previous mouth shape is set to the duration of the consonant (step 148) and the vowel to consonant combination (e.g. /l/ to /u/) and the associated time interval (step 149) are entered into the intermediate output file. At this point the program does not return to the decision step 180, but causes a further entry to be made in the transition file (steps 146, 147), the entry containing a time interval equal to half the duration of the current vowel and the vowel itself (e.g. /u/).

One effect of the steps of FIG. 11B is to ensure that the mouth shape corresponding to the current vowel coincides with the middle of the vowel phoneme.

Figure 11C:
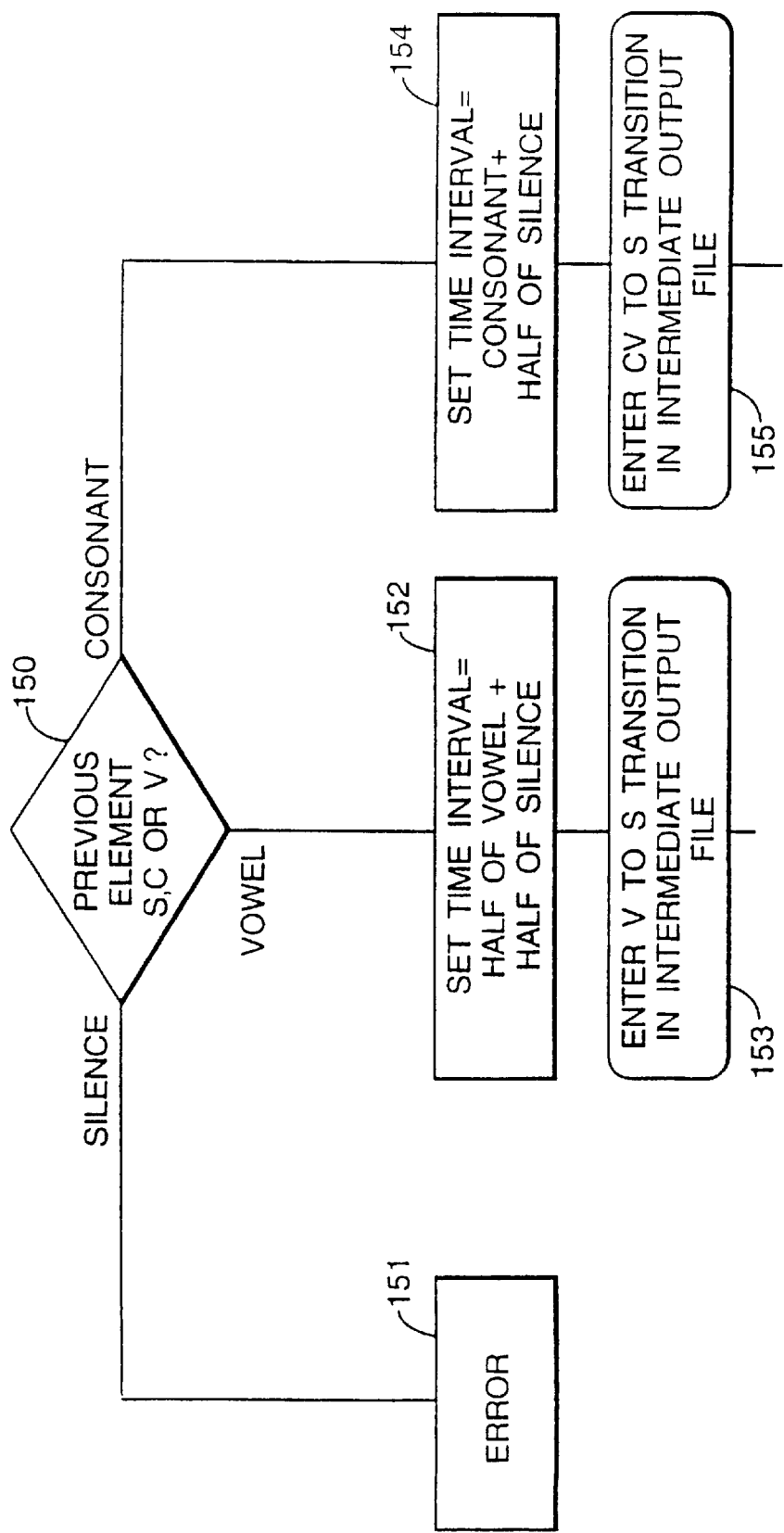

If a silence is found in the current phoneme classifying step (130), then the steps of FIG. 11C are carried out. Firstly, it is found whether the previous phoneme in the phoneme list is a silence, consonant or vowel (step 150). If the previous phoneme is a silence, then an error is indicated (step 151). If the silence is preceded by a vowel then a time interval from the previous mouth shape is set to the sum of half of the vowel duration and half of the silence duration (step 152), and the vowel to silence transition is recorded in the intermediate output file (step 153) together with the time interval. If the previous phoneme is a consonant then the time interval from the last mouth shape is set to sum of the duration of the consonant and half the duration of the current silence (step 154). In this case, the vowel-consonant combination to vowel transition (e.g. /@s/ to /#:/) and associated time interval is entered into the intermediate output file (step 155).

Figure 11D:
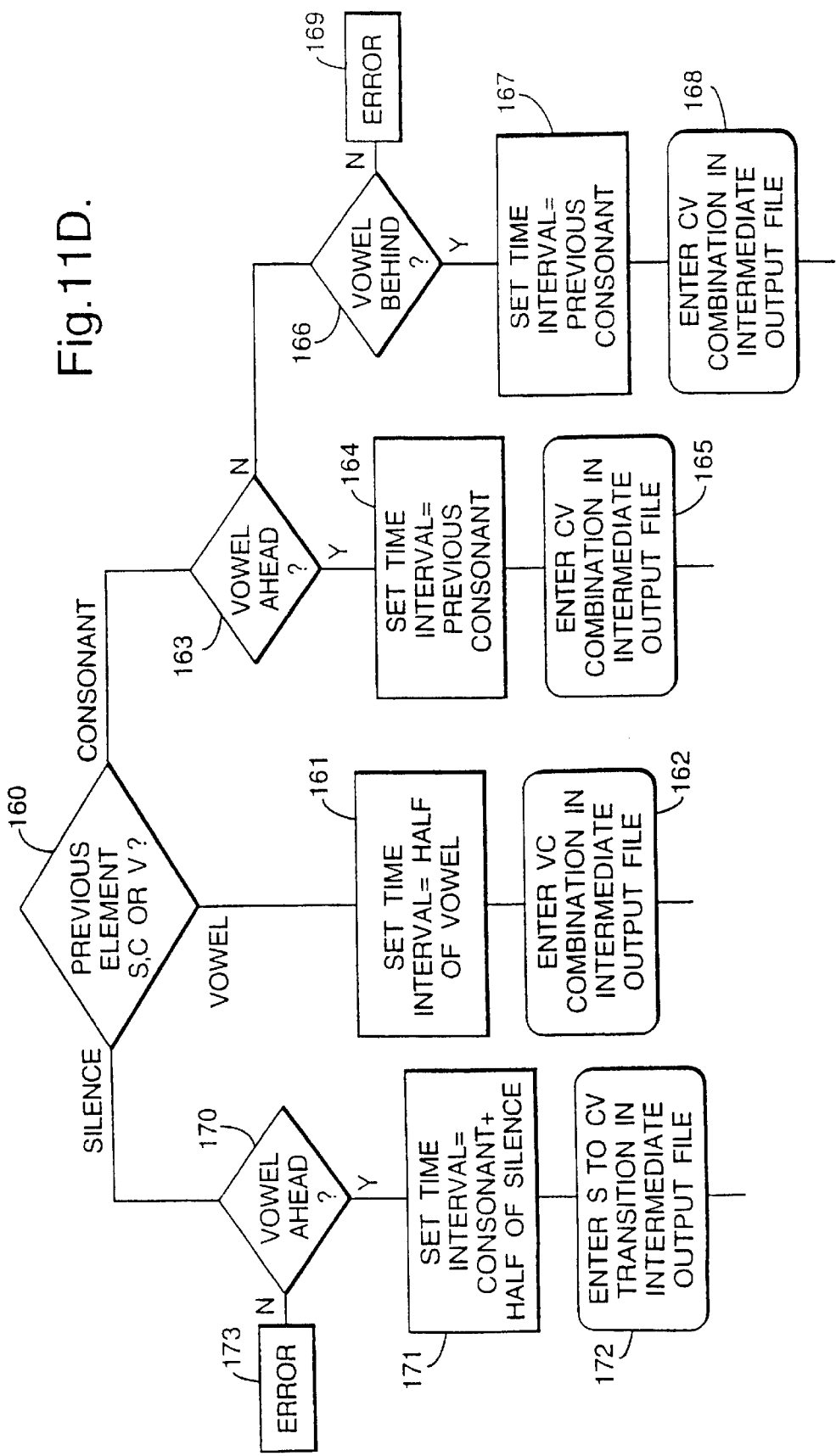

If a consonant is found in step 130, the steps illustrated in FIG. 11D are carried out. Firstly, the previous phoneme is classified as a vowel, silence or consonant (step 160). If it is a vowel, then the time interval is set to half the duration of the vowel (step 161), and the vowel-consonant combination (e.g. /{/ to /f/) is recorded together with the time interval in the intermediate output file (step 162). If the previous phoneme is a consonant, then the program searches forward through the phoneme list for a vowel phoneme (step 163). If one is found the consonant-vowel combination (of the previous consonant and the later vowel) (e.g. /f/ to /u/) and the associated time interval (equal to the duration of the previous consonant) are entered in the intermediate output file (steps 164, 165). If no vowel is found in the forward search (step 163) then the program causes the processor to search backwards for a vowel (step 166). If this search is successful then the vowel-consonant combination (of the earlier vowel and, the current consonant—e.g. /@/ to /s/) is recorded together with an associated time interval (equal to the duration of the previous consonant) (steps 167, 168). If neither a forward search nor a backward search finds a vowel an error indication results (step 169). If the phoneme immediately preceding the current consonant is found to be a silence, then a forward search for a vowel is carried out (step 170); if a vowel is found a time interval equal to the sum of the durations of the current consonant and half the duration of the preceding silence is recorded together with a silence to consonant-vowel combination transition in the intermediate output file (steps 171, 172). If no vowel is found in the word then an error is indicated (step 173).

Figure 12:
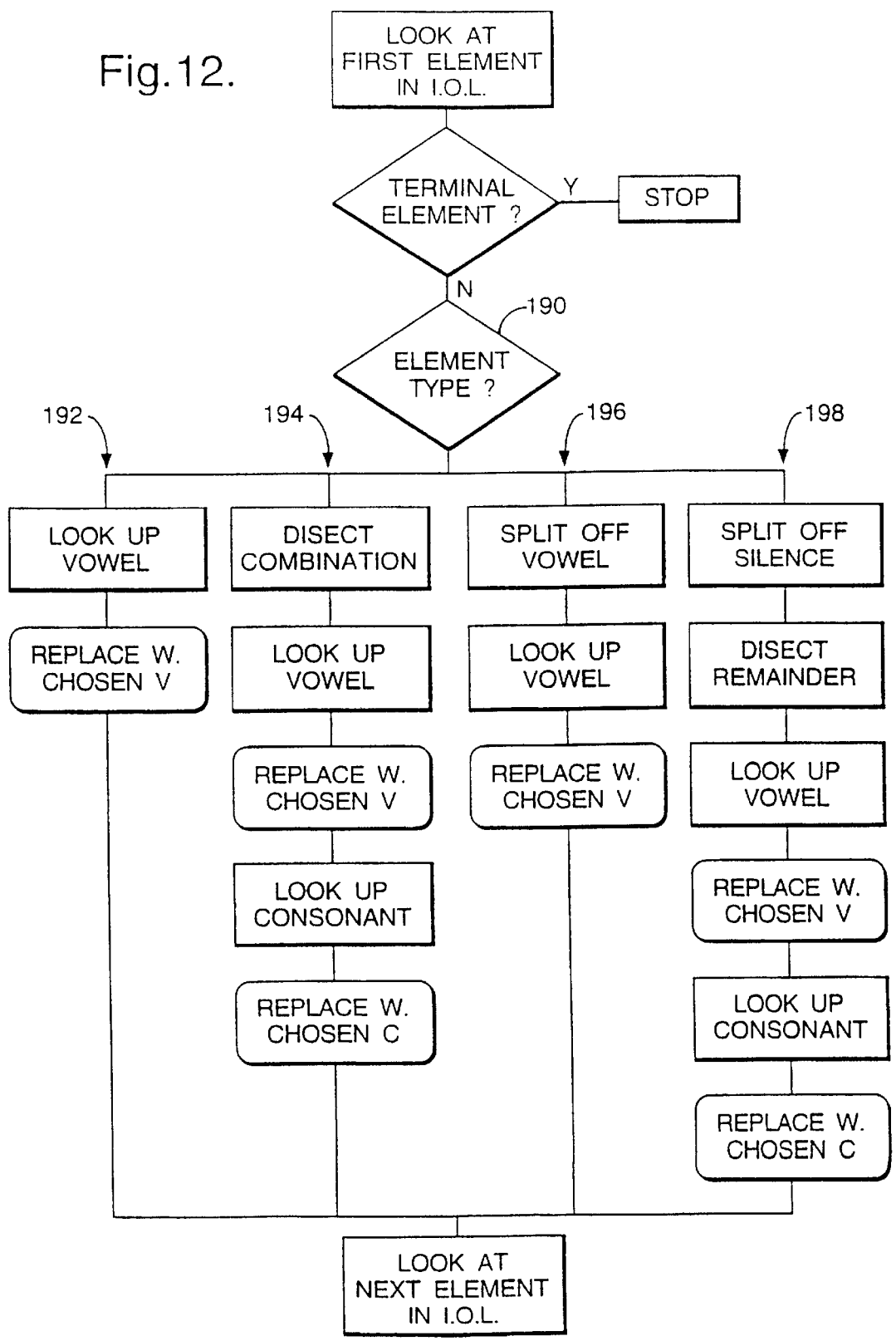
FIG. 12 illustrates the procedure for producing a file specifying the timing and nature of the maximal mouth shapes on the basis of the intermediate output file.

In FIG. 12, the vowels and phoneme combinations in the intermediate output file are converted into vowel groups and phoneme group combinations by accessing the look-up table 13. In principle the contents of this could be as set out in Table 2 above, so that each vowel or phoneme combination translates to a group number. However it was found more convenient to represent each group not by a group number but by one designated phoneme of the group; for example the phonemes /p/, /b/ and /m/ were all translated into /p/. To achieve this the processor is controlled by the program illustrated in FIG. 12. For each element in the intermediate output file, the type of element is determined (step 190) to be one of: a vowel (steps 192 are carried out); a vowel/consonant combination (steps 194 are carried out); a vowel/silence transition (steps 196 are carried out); or a combination to silence transition (steps 198 are carried out). The steps (192, 194, 196, 198) are effective to convert each of the constituent vowel or consonants to a vowel or consonant chosen to represent the group. This procedure returns a group/group combination list which now contains a maximum of 68 different vowel groups and phoneme group combinations as discussed above.

Figure 13A:
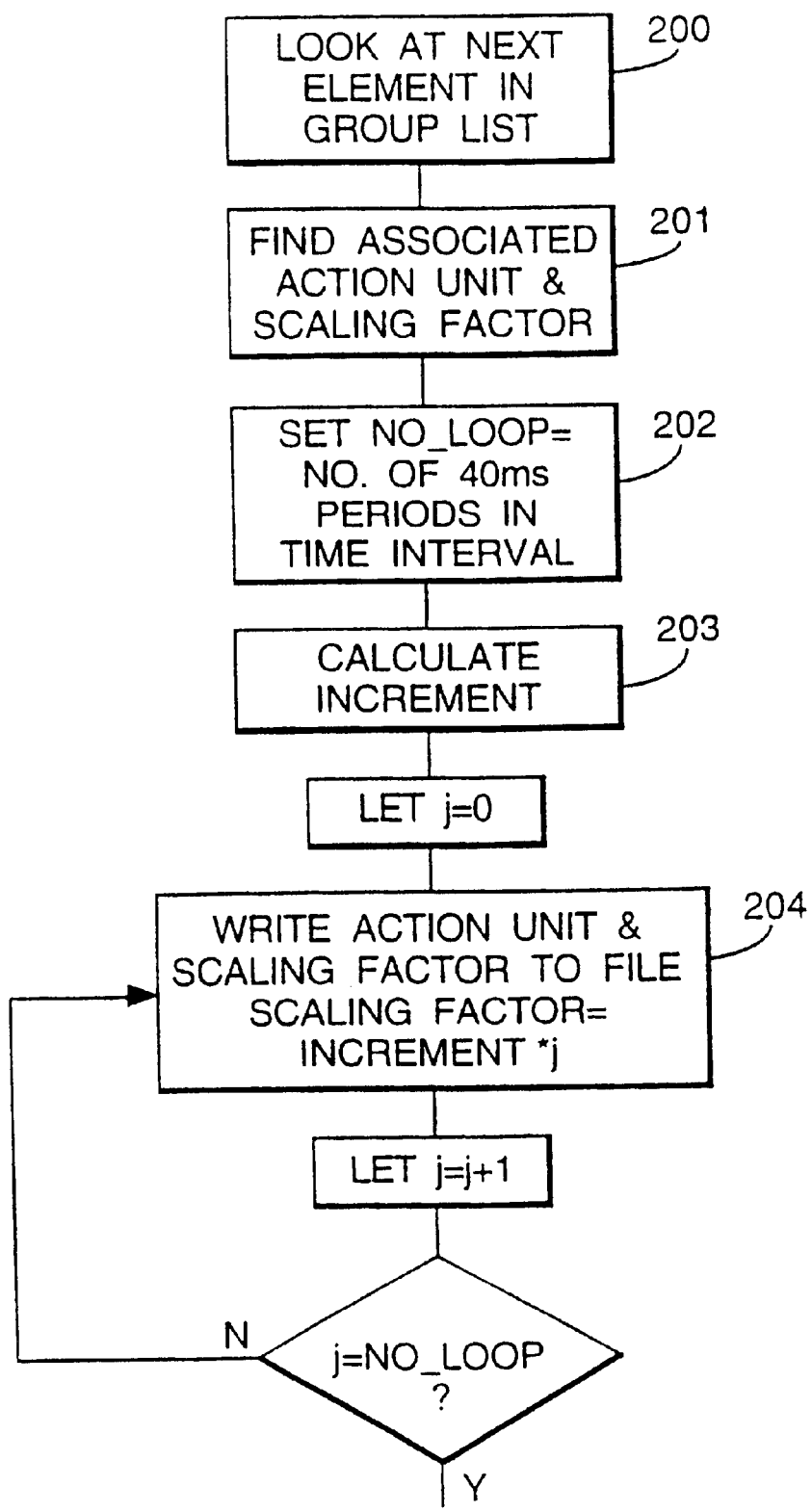
FIGS. 13A and 13B illustrate the procedure for producing a file specifying both the maximal mouth shapes and intermediate mouth shapes.
Figure 13B:
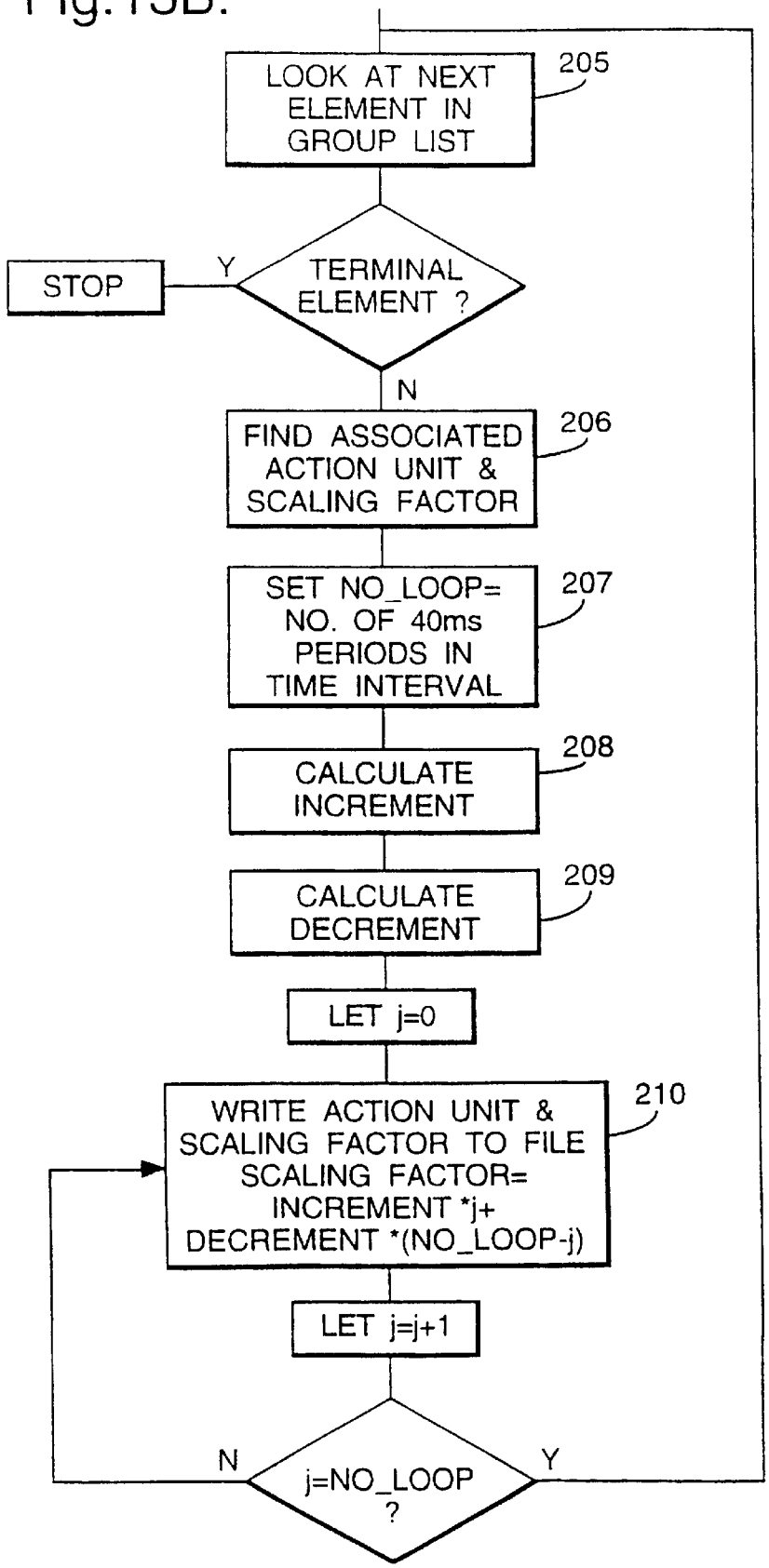

In FIGS. 13A and 13B the resulting group list is converted to an action unit file using the action unit look-up table 14 (the contents of which are as set out in columns 3, 1 and 4 of Table 3 above—or with representative phonemes in column 3 if this is the preferred option) to find the action unit representing each element in the group/group combination list. The action unit file may then be used to provide a sequence of command signals generated at 40 ms intervals.

In more detail, the conversion procedure begins with fetching the first element from the group list (step 200), whereafter the action unit look-up table is accessed to determine the action unit and scaling factor associated with that element (step 201). Then, the number of entire 40 ms periods within the time interval associated with the first element is calculated (step 202). The scaling factor of the initial action unit is then divided by the number of periods to give an increment value (step 203). The procedure then enters a loop of instructions (step 204) producing a command signal for each 40 ms period. The scaling factor in the command signal is increased (from zero) by the calculated increment each time the loop of instructions is executed.

The next element in the group list is then fetched (FIG. 13B—step 205), and the corresponding action unit and scaling factor is found using the action unit look-up table 14 (step 206). As in step 202, the number of whole 40 ms periods within the time interval associated with that element of the group list is then found (step 207). As before, the scaling factor of the action unit associated with the current element is then divided by the number of periods calculated to give an increment value (step 208). The scaling factor of the previous element in the group list is divided by the same number to give a decrement value (step 209). The procedure then enters a loop of instructions to calculate the command signals to be output. These comprise a weighted combination of the action unit produced in the relation to the previous element, and the action unit associated with the current element in the group list. The weight given to the previous action unit is decreased by decrementing the scaling factor by the decrement value for each 40 ms period, whereas the weight given to the current action unit is increased by increasing the scaling factor (from zero) by the increment value for each 40 ms period (step 210). In this way the command signals output provide a stepped transition from one mouth shape to the next.

Similar operations (steps 206 to 210) are then applied to each subsequent element in the group list until a termination element is reached.

Command signals are generated on the basis of the action unit file and are transmitted to the image synthesis unit 5 at 40 ms intervals to enable the generation of an image of a head which has articulation corresponding to the output of the text-to-speech synthesiser.

It will be noted from the above discussion that the viseme or mouth shape chosen for a vowel is one allocated in advance to that vowel, that the mouth shape chosen for a vowel-consonant (or vice versa) combination is one allocated in advance to that combination, and the mouth shape chosen for a consonant—consonant transition is one allocated in advance to the first of the consonants in the same contex—i.e. in this example, having the same following (or, in default, preceding) vowel. If desired—albeit with the penalty of increasing the number of action units required—the selection of mouth shapes may be made more context dependent. For example, one might choose a mouth shape for a consonant-vowel transition with the choice being dependent not only on the consonant and on the following vowel but also on the preceding vowel (i.e. consonant-vowel-consonant combination). The choice for a consonant—consonant transition could be made to depend on the first consonant and both the following and preceding vowels (if present) or indeed on the two consonants and two vowels.

Little has been said so far about how the action units stored in the image synthesis unit 5 are generated. This in the prototype was accomplished by making a video recording of a person speaking words containing all of the required 68 vowel groups and vowel group/consonant group combinations, and using a frame grabber to display still frames of the recording so that those frames corresponding to the vowels and those frames corresponding to consonant/vowel combinations could be identified manually. Once those frames (in bitmap form) had been identified it was then necessary to determine the displacements of from the reference wire frame model which those frames represented. This is done using a conformation program which calculates the deformation required of a wire frame model to fit a given bitmap image.

What is claimed is:

1. A method of generating signals representing a moving picture of a face having visible articulation matching a spoken utterance, said method comprising:

receiving a sequence of phonetic representations corresponding to successive portions of the utterance;

identifying a sequence of mouth shapes in accordance with said sequence of representations;

generating for each identified mouth shape a command specifying that shape;

generating intermediate commands each of which specifies a shape intermediate the shapes specified by the preceding and following commands;

said representations comprising a first set of representations that represent portions of a first phonetic kind, and a second set of representations that represent portions of a second phonetic kind;

said identification of a sequence of mouth shapes including:

identifying a mouth shape for each representation from said first set; and identifying a mouth shape for each transition from a phonetic representation in said first set to a phonetic representation in said second set, for each transition from a phonetic representation in said second set to a phonetic representation in said first set and for each transition from a phonetic representation in said second set to a phonetic representation in said second set.

2. A method as in claim 1 wherein said representations represent phonemes, the first set of representations representing vowels and the second set of representations representing consonants.

3. A method as in claim 2 in which the identification of a mouth shape for each transition between consonant and vowel phonemes is performed as a function of the vowel phoneme and the consonants phoneme.

4. A method as in claim 2 in which the identification of a mouth shape for each transition between two consonant phonemes is performed as a function of the first of the two consonants phonemes and of the vowel phoneme which most closely follows or precedes it.

5. A method as in claim 2 in which the identification of a mouth shape for each transition between two consonant phonemes is performed as a function of the first of the two consonant phonemes and of the vowel phoneme which most closely follows it or in the absence thereof that which precedes.

6. A method as in claim 3 in which the identification is performed as a function of only the vowel phoneme and the consonant phoneme.

7. A method as in claim 3 in which the identification is performed as a function also of at least one other phoneme within the same word.

8. A method as in claim 3 in which the identification of a mouth shape for each transition between two consonant phonemes is performed as a function of the first of the two consonant phonemes and of the vowel phonemes and of the vowel phoneme which most closely follows or precedes it.

9. A method as in claim 3 in which the identification of a mouth shape for each transition between two consonant phonemes is performed as a function of the first of the two consonant phoneme and of the vowel phoneme which most closely follows it or in the absence thereof that which precedes it.

10. A method as in claim 4 in which the identification is performed as a function of only the phonemes therein specified.

11. A method as in claim 4 in which the identification is performed as a function also of at least the other phoneme within the same word.

12. A method as in claim 5 in which the identification is performed as a function of only the phonemes therein specified.

13. A method as in claim 5 in which the identification is performed as a function also of at least one other phoneme within the same word.

14. An apparatus for generating signals representing a moving picture of a face having visible articulation matching a spoken utterance, said apparatus comprising:

means arranged in operation to receive a sequence of phonetic representations corresponding to successive portions of the utterance and in response thereto to identify a sequence of mouth shapes in accordance with said sequence of phonetic representations;

generate for each identified mouth shape a command specifying that shape;

generate intermediate commands each of which specifies a shape intermediate the shapes specified by the preceding and following commands;

said representations comprising a first set of representations that represent portions of a first phonetic kind, and a second set of representations that represent portions of a second phonetic kind;

means to identify a mouth shape for each phonetic representation in said first set; and means to identify a mouth shape for each transition from a phonetic representation in said first set to a phonetic representation in said second set, for each transition from a phonetic representation in said second set to a phonetic representation in said first set and for each transition from a phonetic representation in said second set to a phonetic representation in said second set.

* * * * *